April 4, 1950 A. G. WEIER 2,502,611
SAUSAGE STUFFING APPARATUS
Filed March 15, 1946 6 Sheets-Sheet 1

INVENTOR.
ANTON G. WEIER
BY
ATT'YS.

April 4, 1950 A. G. WEIER 2,502,611
SAUSAGE STUFFING APPARATUS

Filed March 15, 1946 6 Sheets-Sheet 2

INVENTOR:
ANTON G. WEIER
BY
ATT'YS.

April 4, 1950     A. G. WEIER     2,502,611
SAUSAGE STUFFING APPARATUS
Filed March 15, 1946     6 Sheets-Sheet 3

*INVENTOR:*
ANTON G. WEIER
BY
ATT'YS.

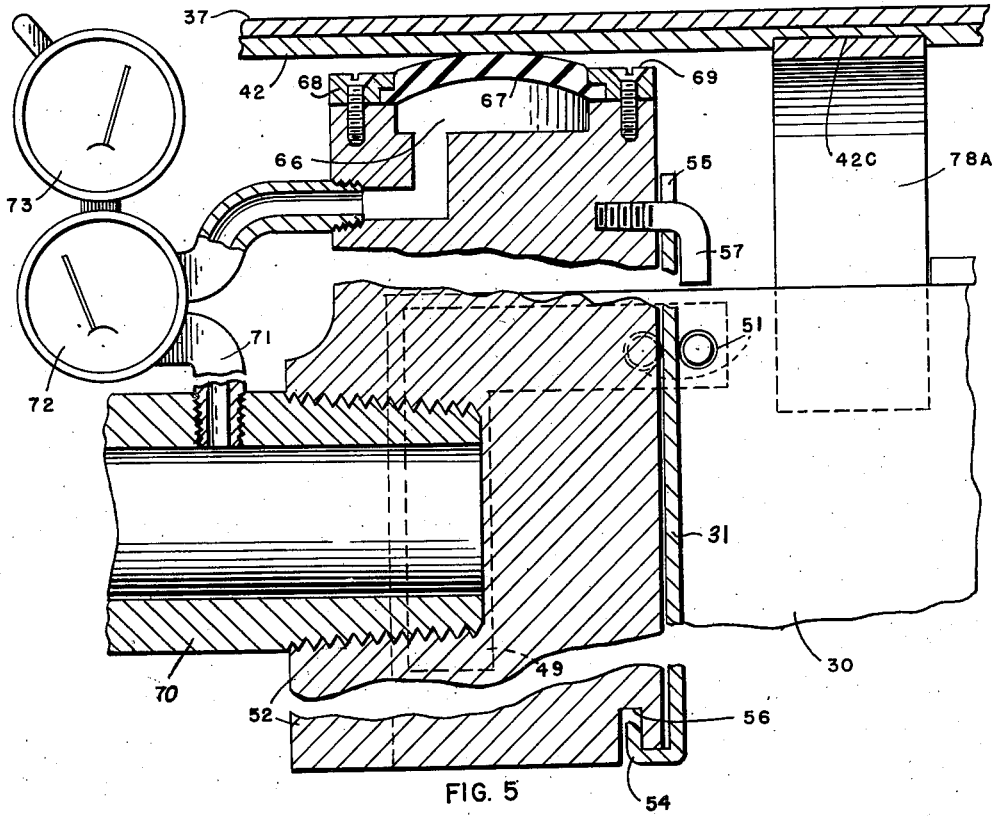
FIG. 5
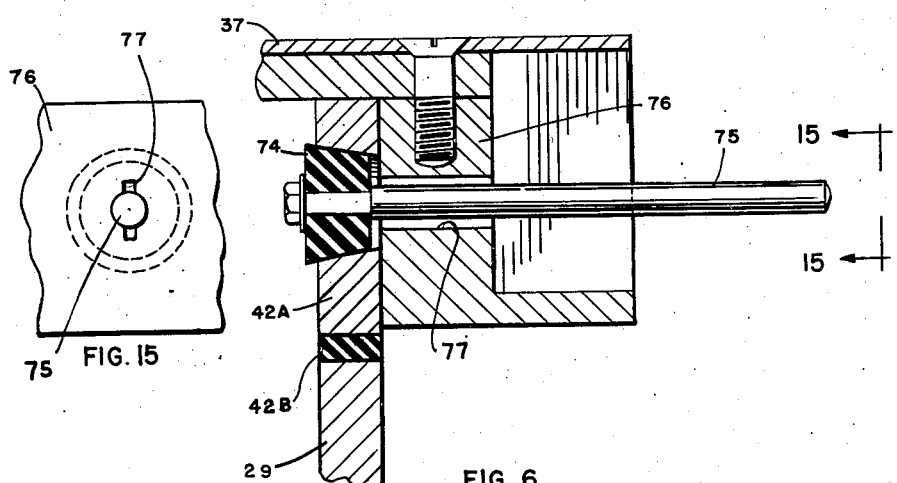
FIG. 15
FIG. 6
INVENTOR:
ANTON G. WEIER
BY
ATT'YS.

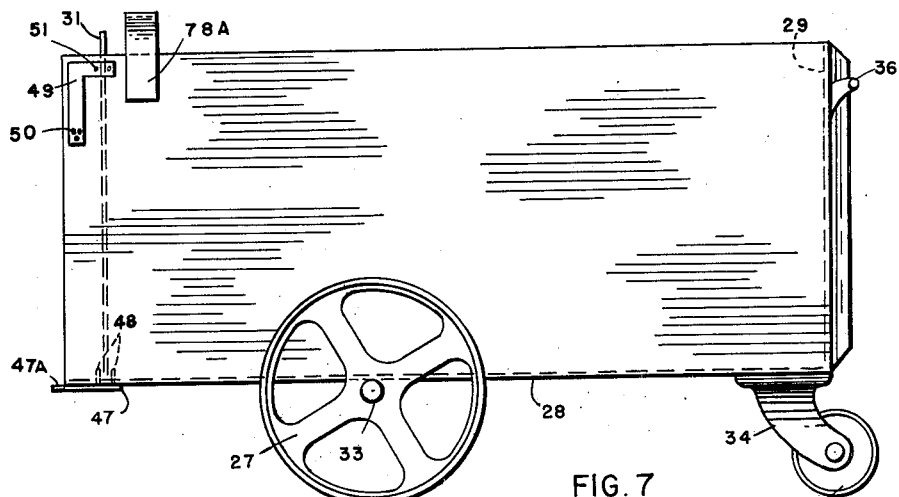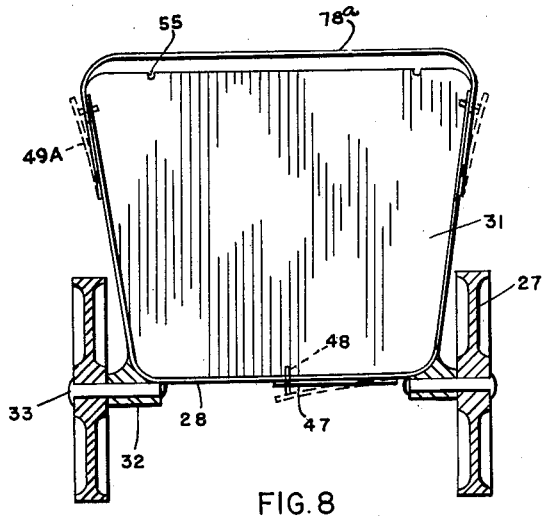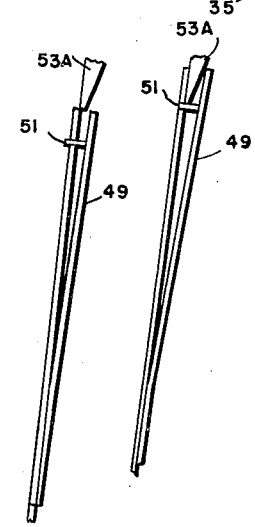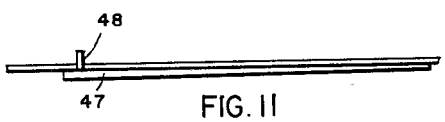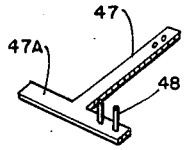

*INVENTOR:*
ANTON G. WEIER
BY
*Stewart Batchelor*
ATT'YS

Patented Apr. 4, 1950

2,502,611

UNITED STATES PATENT OFFICE 2,502,611

SAUSAGE STUFFING APPARATUS

Anton G. Weier, Chicago, Ill.

Application March 15, 1946, Serial No. 654,625

11 Claims. (Cl. 17—39)

My invention relates to apparatus for stuffing ground meat into sausage casings. Under the present practice the meat mass issuing from the chopper or grinder is deposited in portable containers, known as boxes, these being transported to locations adjacent to the stuffing machines. Here the meat dough is removed from the containers by hand, implements in the nature of shovels being employed, and deposited into the stuffing machines.

It is apparent that the above process entails a tedious and laborious operation to transfer the meat dough from the containers into the stuffing machines, and it is therefore my main object to provide an apparatus which eliminates the handling of the meat dough after it has been deposited in a container and moved to the location where the stuffing is done.

A further object is to devise an apparatus which combines the meat dough container with a machine directly operable to extrude the contents of the container into the stuffing zone.

Another object is to provide an apparatus of the above character in which units in the container and extruding machine co-act to join them operatively when assembled and restore the container to its independent form when separated.

An important object is to design the novel apparatus for a large capacity while using a minimum of manual labor or attention.

With the above objects in view and any others which may suggest themselves from the description to follow, a better understanding of the invention may be had by reference to the accompanying drawings, in which, Fig. 1 is a side elevation of the apparatus showing the meat dough container in the zone of the stuffing machine, but not joined with the same;

Fig. 5 is a magnified section, broken away in places, on the line 5—5 of Fig. 4, and pertaining to a zone substantially midway between the rear and front ends of the apparatus;

Fig. 6 is a magnified section on the line 6—6 of Fig. 3;

Fig. 7 is a side view of the meat dough container;

Fig. 8 is a left-hand end view of Fig. 7, partly in section;

Figs. 9 and 10 represent a detail in the lateral portions of the container, showing changes of position;

Figs. 11 and 12 are similar views of a detail in the bottom portion of the container;

Fig. 15 is a section on the line 15—15 of Fig. 6;

Fig. 16 is a perspective view of a locking device seen in Fig. 12; and

Figure 1:
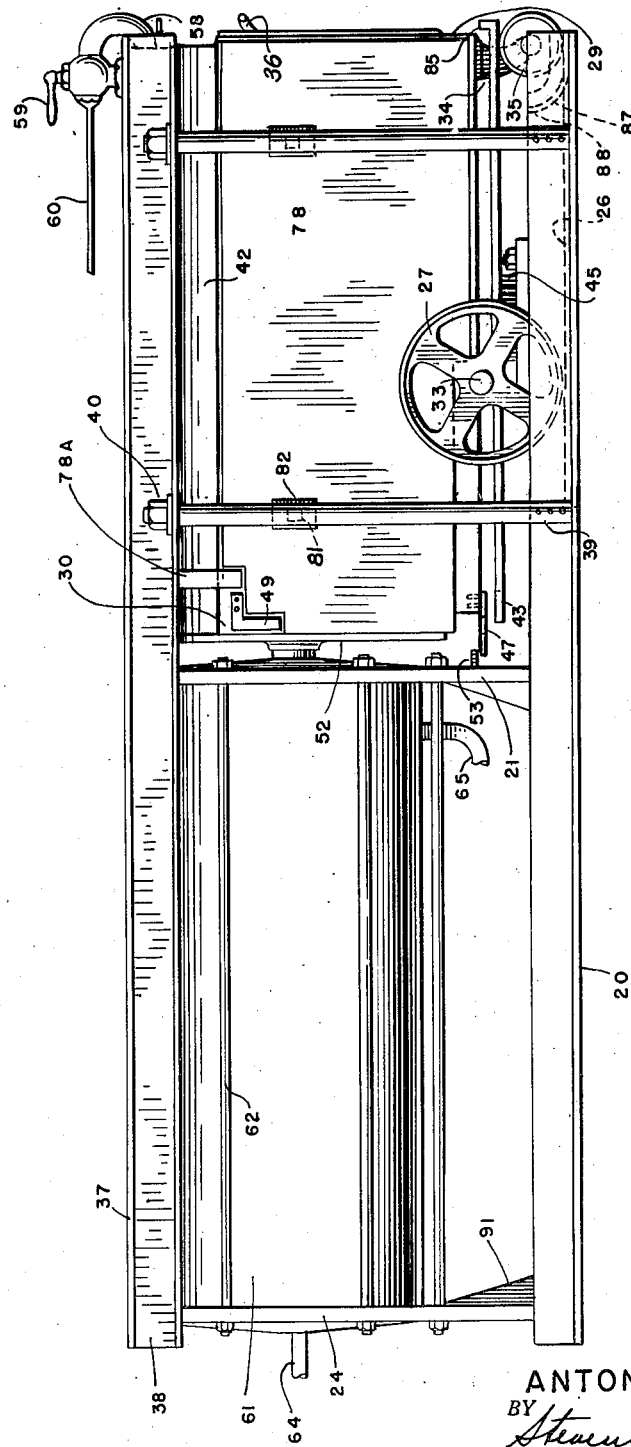

In accordance with the foregoing, specific reference to the drawings indicates the base of the apparatus as a pair of long angle bars 20 disposed in laterally-spaced relation and with hollows facing outwardly. Approximately half-way toward the front the angle bars are spaced by a cross plate 21 formed with base flanges 22 for the application of bolts 23 to secure the cross-plate to the floor or other surface on which the apparatus is placed. An end plate 24 similar to the cross-plate 21 is applied in the same manner at the front end of the apparatus.

A floor plate 25 is located between the angle bars 20 near the rear end of the apparatus, such floor plate supporting a pair of angle bars 26 positioned inwardly of and similarly to the angle bars 20. However, the angle bars 26 are intended to serve as tracks for the side wheels 27 of the meat dough container 28.

The meat dough container 28 is a tub-like vessel having a rear end wall 29, side walls 30 and a front end wall 31. As seen in Fig. 8, the container has side lugs 32 near the middle receiving driven spindles 33 on which the wheels 27 are freely centered. The container also has a caster fork 34 at the rear for a center wheel 35. A handle 36 projects rearwardly from the wall 29 for the manual propulsion of the container 28 between the meat grinding location and the present apparatus, and Fig. 1 indicates that the container has been wheeled onto the tracks 26.

The apparatus is also designed to receive a table top 37, such top resting on a pair of upper angle bars 38 similar to the base angle bars 20 and directly above the same. The bars 38 are supported by two pairs of posts 39 rising from the angle bars 20, and passing through the angle bars 38 as screws to receive securing nuts 40. While the posts may be secured to the angle bars 20 in any suitable manner, Fig. 4 shows that they are preferable forked to receive the upward wings of such bars and receive cross-rivets 41 to secure the joints therewith.

Figure 2:
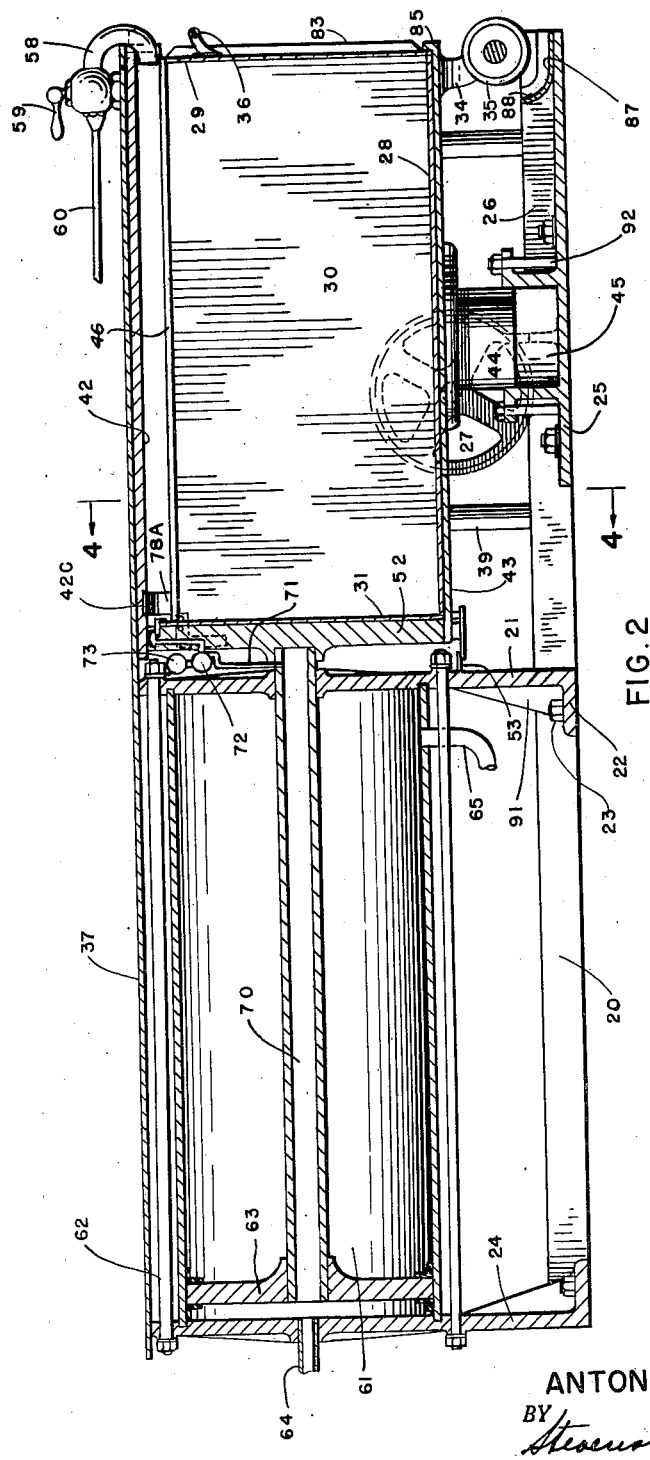
Fig. 2 is a longitudinal section taken on the line 2—2 of Fig. 3 and showing the container joined to the stuffing machine.
Figure 3:
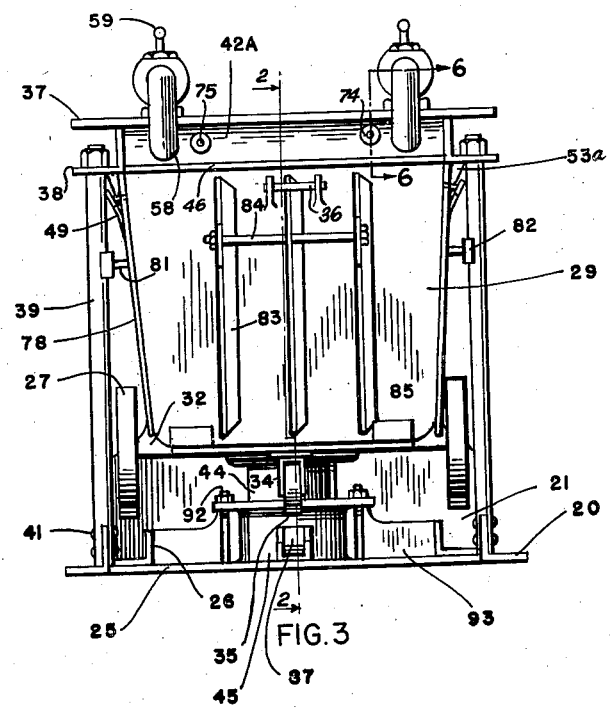
Fig. 3 is a rear end view of the apparatus, as seen from the right-hand side of Fig. 2.
Figure 4:
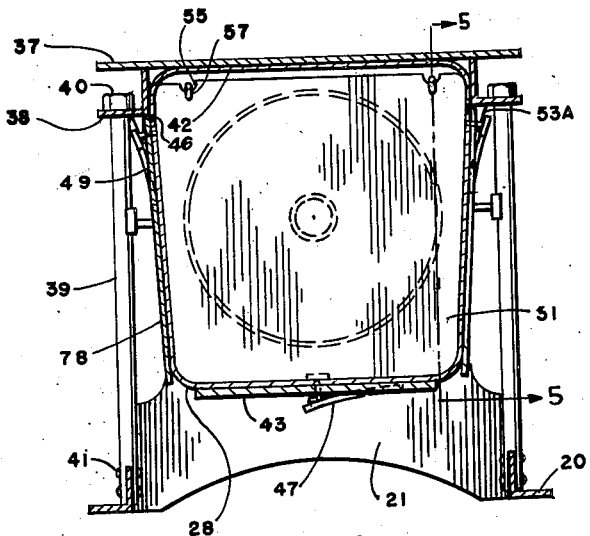
Fig. 4 is a section on the line 4—4 of Fig. 2.

While the container 28 is open at the top when it is wheeled into the position of Fig. 1, it is intended to receive a cover 42 carried by the table top 37 by being raised to meet the cover as shown in Fig. 4. For this purpose the platform 43 of a lifting unit is located at a clearing level below the container as the latter is wheeled into place. The platform is carried by a piston 44 operating hydraulically in a cylinder 45 rising from the floor plate 25; and Figs. 2 to 4 show that the container 28 has been raised to meet the cover 42. Means for operating the hydraulic lift have not been illustrated, being optional. With a packing strip 46 carried by the bottom edge of the cover, it is now apparent that the container becomes closed on being lifted as described.

While the container 28 is still open at the top, and before it is wheeled onto the tracks 26, means are provided to temporarily hold the front end wall 31 in place. Figs. 7 and 8 show that the bottom of the container 28 receives a transverse, T-shaped spring blade 47, more clearly shown in Figs. 12 and 16, the outer end of the blade being fast to the container and the inner one carrying a pair of upward studs 48 receiving the bottom portion of the end wall 31 between them. Each side wall of the container also receives an L-shaped spring blade 49 whose lower portion is secured to the wall as indicated at 50 in Fig. 7, and whose upper portion has a pair of studs 51 projecting through the container side wall to receive the corresponding portion of the end wall 31 between them. This wall is thus retained in three places to hold its vertical position, and the container can now be loaded with a mass of the meat dough and started on its way to the tracks 26.

The forward progress of the container over the tracks 26 finds a limit when the end wall 31 meets a massive crosshead 52. With the container sides, bottom and cover extended beyond the end wall 31, it is seen from Fig. 2 that when the container is lifted as previously stated, the crosshead 52 will become pocketed within the front end of the container.

The lifting of the container is designed to disconnect the end wall 31 from the three retaining zones previously described, and attach it to the cross head 52. A device to do this in the bottom zone is a projection 53 from the cross-plate 21. Fig. 7 shows that one arm 47a of the spring blade 47 projects from the front end of the container. Thus, as the latter rises to the elevated position, such arm meets and is held back by the projection 53, withdrawing the studs 48 from the full-line position of Figs. 8 and 11 to the dotted line position of Fig. 8 and the full-line position of Fig. 12 to be flush with the inside of the container bottom. At the same time devices to disconnect the end wall 31 along the sides become active. Thus, wedges 53a carried by the angle bars 38 bear outwardly on the spring blades 49 to retract them from the position of Figs. 8 and 9 to that of Fig. 10, or flush with the inner sides of the container walls.

While the end wall 31 has become freed from the container bottom and side walls by the above action, means operate concurrently to attach the end wall to the crosshead 52. Thus, the end wall has a pair of upward hooks 54 at the bottom and a pair of slots 55 at the top. The hooks 54 are initially below a pair of slots 56 in the bottom of the crosshead; and the slots 55 are in line with a pair of hooks 57 projecting rearwardly from the upper portion of the crosshead. Thus, when the container is lifted, the hooks 54 engage the slots 56 and the slots 55 receive the hooks 57, anchoring the end wall to the crosshead as shown in Fig. 5.

With the end wall 31 freed from the side walls and bottom of the container, the crosshead 52 may be moved toward the right according to Fig. 2, to bear on the mass of meat dough in the container. The rear end 42a of the cover 42 has a pair of outlet tubes 58, these curving forward over the table top 37 to terminate with dispensing valves 59 which are extended with the conventional type of nozzles 60 for filling sausage casings.

The mechanism for operating the crosshead 52 involves a large horizontal cylinder 61 fitted between the cross-plate 21 and the end plate 24, tie bolts 62 being applied to hold the assembly together. The cylinder contains a piston 63 operated by compressed air or a hydraulic medium. Terminal air or fluid connections 64 and 65 are indicated for imparting a reciprocating movement to the piston, suitable controls being employed but not shown.

Fig. 5 shows that the end wall 31 does not reach to the cover of the container, but that the crosshead 52 rises close to the same. However, the crosshead is designed to make a seal with such cover by means indicated in the figure referred to. Thus, the crosshead is made with a transverse cavity 66 surmounted by a rubber strip 67. The latter is secured by edge clamping plates 68 and screws 69 to the crosshead. Fig. 2 shows that the rod 70 of the piston 63 is tubular and attached to the crosshead at its free end. Thus, the compressed air or other motive medium for the piston also fills the rod 70. Figs. 2 and 5 show that a tube 71 leads from the rear end portion of the rod to the cavity 66, such tube carrying standard equipment comprising a dial pressure gage 72 and a pressure regulator 73. The amount of pressure in the cavity 66 can thus be regulated to properly apply the sealing strip 67 to the cover 42 while the crosshead assembly moves rearwardly in the container. This movement supplies the meat dough constantly or periodically at a desired rate to the dispensing valves 59, either or both of which may be used, according to the demand. Thus, the container becomes a large supply source for the sausage stuffing zone, enabling a great number of casings to be filled before the container becomes empty.

While the rate of extrusion in the container may be regulated by controlling the motive medium for the piston 63, the tendency for air pressure to accumulate in the container on the advance of the crosshead may be counteracted at times by relief valves 74 fitted in the rear end 42a of the cover 42. As shown in Fig. 6, these valves are of the poppet type and have stems 75 passing through a reinforcement 76 of the said end wall, the latter having grooves 77 on opposite sides of the valve stems 75 to permit the escape of air from the container when the valves are open. Fig. 6 shows that the rear end 42a carries a rubber strip 42b forming a seal between the container wall 29 and the said rear end.

Figure 14:
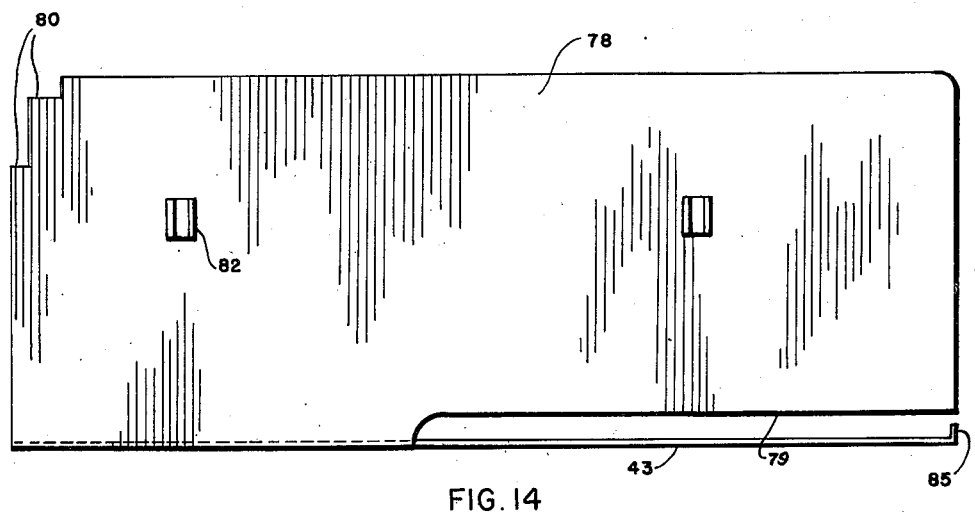
Fig. 14 is an elevation of the same.
Figure 17:
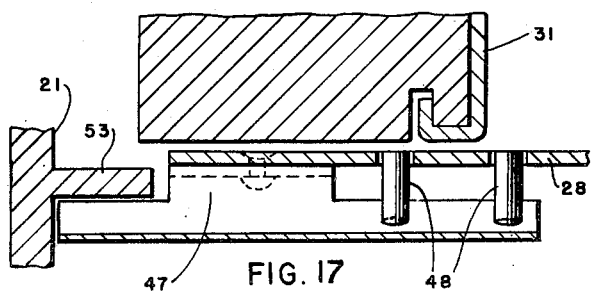
Fig. 17 is an enlargement of the lower central portion of Fig. 2, showing the application of the said locking device.

The lifting platform 43 is sufficiently narrow to clear the inner ends of the side wheel spindles 33; and the platform is built up with side walls 78 designed to reinforce the container side walls 30 against the pressure of the meat dough during the extrusion process. The side walls 30 are held against separation near the front ends by an arched tie bar 78a shown in Figs. 5, 7 and 8. Fig. 5 also shows that the cover 42 is recessed at 42c to sink the crown of the tie bar sufficiently to clear the passing crosshead 52 when the container is in the raised position. Fig. 14 shows that the platform walls 78 are formed with clearance slots 79 for the wheel lugs 32 and with frontal upper corner clearances 80 for the spring blades 49; and the platform walls 78 carry brackets 81 presenting shoes 82 slidable along the inner sides of the posts 39. Thus, the latter form guides for the walls of the platform during its rise; and when the platform walls encase the container walls, as per Fig. 4, the posts 39 form a backing for the platform walls to resist the expansive pressure of the meat dough as induced by the advance of the crosshead 52. The rear end wall 29 is externally reinforced against such pressure by angle cleats 83 bound by a tie bolt 84.

Figure 13:
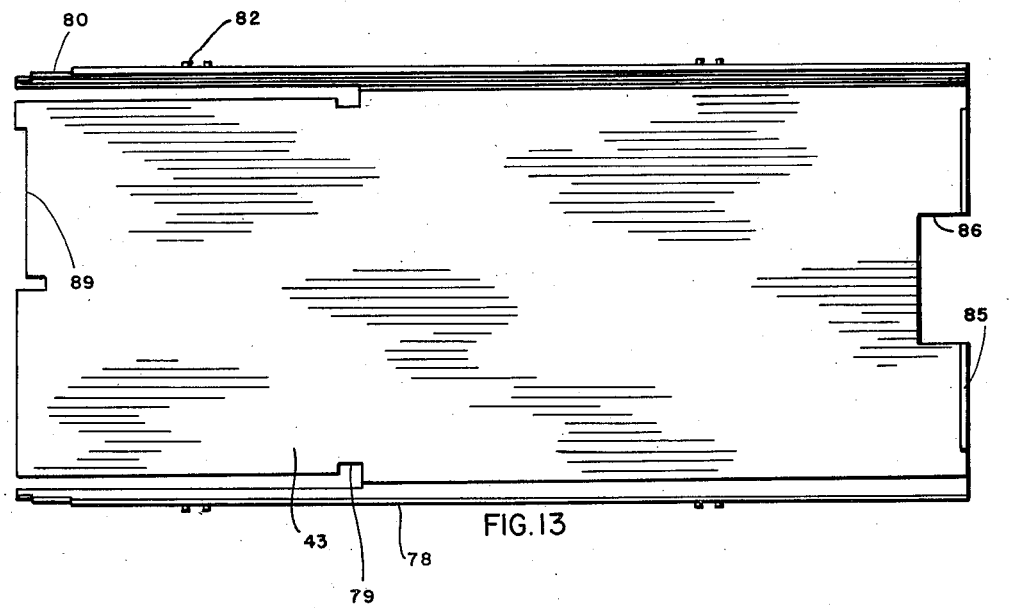
Fig. 13 is a plan view of a lifting unit.

It is noted that the lifting platform has a pair of upward hooks 85 rising from its rear end to overlap the rear end of the container bottom during the lifting action and back the container against the pressure of the crosshead 52. Fig. 13 shows that the rear edge of the platform is recessed at 86 to clear the caster fork 34 of the center wheel 35. The latter enters a channeled track 87 extended from the floor plate 25 when the container is wheeled into the machine, such track having an upward turn 88 as a terminus against the excessive advance of the container. The platform 43 is also recessed at 89 in its forward edge to afford a clearance for the pin-carrying arm of the T-shaped spring blade 47.

It is noted that the cross-plate 21 and the end plate 24 have facing webs 91 for purposes of reinforcement; and the cross-plate may be reinforced by other connections to the tracks and the floor plate 25 to resist the pressure imposed on the container 28 on the active or rearward movement of the crosshead 52. The hydraulic lifting unit 45 is also reinforced by bolts 92 rising from the floor plate 25 through cross-webs 93 connected to the tracks 26.

It should be apparent without further detail that the lowering of the lifting platform 43 will cause the end wall 31 to become disconnected from the crosshead 52 after the latter has fully receded from its working stroke, and to again become connected to the container, so that the latter will rest on the tracks in a position to be withdrawn and wheeled away for another filling. It goes without saying that a number of containers may be employed and held in readiness for consecutive connection to the machine, so that the latter may be kept in action with a minimum amount of interruption.

It is now evident that the novel apparatus departs from the conventional practice of removing the meat dough by hand or other means from one container into another having the extruding and stuffing means. In the present case the original container of the meat dispensed by the grinder forms both a large capacity reservoir and a press-component in cooperation with the power extruding mechanism. Further, the apparatus is compactly grouped with the container under the table top stuffing zone, so that no extra room is required or taken up by the apparatus. Further, the connection between the container and the extruding mechanism is automatically made by the simple operation of the lift, and no other control or attention is required before the power for the extruding mechanism is turned on. The apparatus can therefore be attended and operated without the need of skill. Finally, it is evident that the apparatus is an assembly of simple parts which are reinforced wherever necessary and operate on proven mechanical principles.

While I have described the invention along specific lines, various minor changes or refinements may be made therein without departing from its principle, and I reserve the right to employ such changes and refinements as may come within the scope and spirit of the appended claims.

I claim:

1. A machine for extruding material of soft-mass consistency comprising a container for the material having one end offset to form a recess and a closure removable from said end, a cylinder and piston including a plunger crosshead opposite said end and receivable in said recess, means to free said end closure from the container and mount it on the inner side of the crosshead, a material outlet at the other end of the container, and means to operate the crosshead between said ends to force material within the container through the material outlet.

2. A machine for extruding material of soft-mass consistency comprising a container for the material having one end offset to form a recess and a closure removable from said end, a cylinder and piston including a plunger crosshead opposite said end and at a higher level, pressure operated means to elevate the container to receive the crosshead in said end in position to force material from the container, second means operative upon elevation of the container to free said end closure from the container and mount it on the inner side of the crosshead, a material outlet at the other end of the container, and means to operate the crosshead between said ends to force material within the container through the material outlet.

3. The structure of claim 2, the top of the container being originally open, a table above the crosshead and adapted to receive the container underneath, a cover carried by the under side of the table in a position to close the rim of the container when the latter is elevated, and means to seal the cover to said rim.

4. The structure of claim 2, the top of the container being originally open, a table above the crosshead and adapted to receive the container underneath, a cover carried by the under side of the table and designed to close the top of the container when the latter is elevated, a flexible rim for the crosshead opposite said cover, and a duct from said compressed-air drive effective to expand said rim into a seal with the cover when the container is in the elevated position.

5. The structure of claim 2, said second means including a spring blade carried by the bottom of the container and presenting a pair of pins on both sides of the bottom portion of said closure, and a fixed stop in the path of said blade when the container is elevated, such stop being effective to flex the blade and withdraw said pins from the region of said bottom portion.

6. The structure of claim 2, said second means including a spring blade carried underneath by the bottom of the container and projecting a pair of pins through such bottom to positions on opposite sides of the bottom portion of said closure, and a fixed stop in the path of said blade when the container is elevated, such stop being effective to flex the blade and withdraw said pins from said positions to clear the interior of the container.

7. The structure of claim 2, said second means including a spring blade carried externally by each side wall of the container and projecting a pair of pins to positions on the opposite sides of each side portion of said closure, and a stationary wedge in the path of each blade when the container is elevated, such wedge being effective to flex the corresponding blade outwardly and withdraw said pins from said positions to clear the interior of the container.

8. The structure of claim 2, said second means including slot formations in the top and hook formations in the bottom of said closure, and hook formations and slot formations in the inner side of the crosshead and in the upward path of said closure formations, the latter engaging the crosshead formations when the container is elevated.

9. The structure of claim 1, and relief valve means in such other end.

10. In a machine for extruding material of soft-mass consistency, a container for said material and designed to receive an elevation movement, a stationary cover for the container and adapted to be engaged by the rim of the same on the elevation of the container, a lifting platform for the container underneath the same, walls rising from the lifting platform along the exterior of the container, an arched tie bar spanning the container walls transversely, and a plunger crosshead movable laterally in the container against said material and forcing the same against the cover, the cover being recessed to sink said tie bars to the extent of clearing said crosshead.

11. A machine for extruding material of soft-mass consistency comprising in combination a base, a piston and cylinder construction mounted on said base, a crosshead on said piston, a container for the material having one end thereof removable, means for placing the container end in proximity to the crosshead, means to free the end closure from the container and mount the same on the crosshead, a material outlet at the opposite end of the container, and fluid means to operate the crosshead and move the same including the end closure to force material out of the container outlet.

ANTON G. WEIER.

REFERENCES CITED

The following references are of record in the file of this patent:

UNITED STATES PATENTS

| Number | Name | Date |
| --- | --- | --- |
| 789,012 | Edelmuth et al. | May 2, 1905 |
| 903,006 | Rowney | Nov. 3, 1908 |
| 1,114,187 | Sayer | Oct. 20, 1914 |
| 1,119,353 | Jackson | Dec. 1, 1914 |
| 2,235,727 | Pearlman | Mar. 18, 1941 |
| 2,354,462 | Johnson | July 25, 1944 |
| 2,427,202 | Dryek et al. | Sept. 9, 1947 |